United States Patent [19]

Böhnensieker

[11] Patent Number: 4,567,673
[45] Date of Patent: Feb. 4, 1986

[54] METHOD AND APPARATUS FOR DRYING PRINTED OR INKED WEBS BY MEANS OF HEAT

[76] Inventor: Franz Böhnensieker, Vom Stein-Strasse 27, D-4834 Harsewinkel, Fed. Rep. of Germany

[21] Appl. No.: 625,916

[22] Filed: Jun. 29, 1984

[30] Foreign Application Priority Data

Jul. 5, 1983 [DE] Fed. Rep. of Germany ....... 3324130

[51] Int. Cl.$^4$ .............................................. F26B 7/00
[52] U.S. Cl. .......................................... 34/23; 34/31; 34/41; 34/68; 34/114; 34/216; 34/217; 34/156; 118/60; 118/259
[58] Field of Search ................... 34/68, 23, 114, 57 A, 34/210, 212, 216, 217, 86, 35, 13, 66, 40, 41, 31, 156; 118/259, 60

[56] References Cited

U.S. PATENT DOCUMENTS

| | | |
|---|---|---|
| 1,144,896 | 6/1915 | Fosbraey .................................. 34/68 |
| 1,579,342 | 4/1926 | Andrews ................................. 34/68 |
| 2,099,162 | 11/1933 | Eberlin .................................... 34/68 |
| 3,289,315 | 12/1966 | Smith, Jr. ............................... 34/114 |
| 4,285,295 | 8/1981 | Iwao et al. ............................. 118/60 |
| 4,458,399 | 7/1984 | Kessler ................................. 118/259 |

*Primary Examiner*—Larry I. Schwartz
*Attorney, Agent, or Firm*—Birch, Stewart, Kolasch & Birch

[57] ABSTRACT

In a method of and apparatus for heat-drying of webs, especially printed or inked webs, the web is first subjected to a contactless heat shock treatment, for example by hot air at about 300° C. It is then heated by a contact process at a lower temperature, for example by heated rollers at about 230° C., after which it is cooled by a contact process in a third step. Each of the heated rollers may have associated therewith a roller for applying a film of a buffer agent and also a cleaning roller. Energy expended in the processes is recovered by the use of heat exchangers. The apparatus may comprise a closed housing divided into separate chambers within which the sequence of steps is carried out.

13 Claims, 4 Drawing Figures

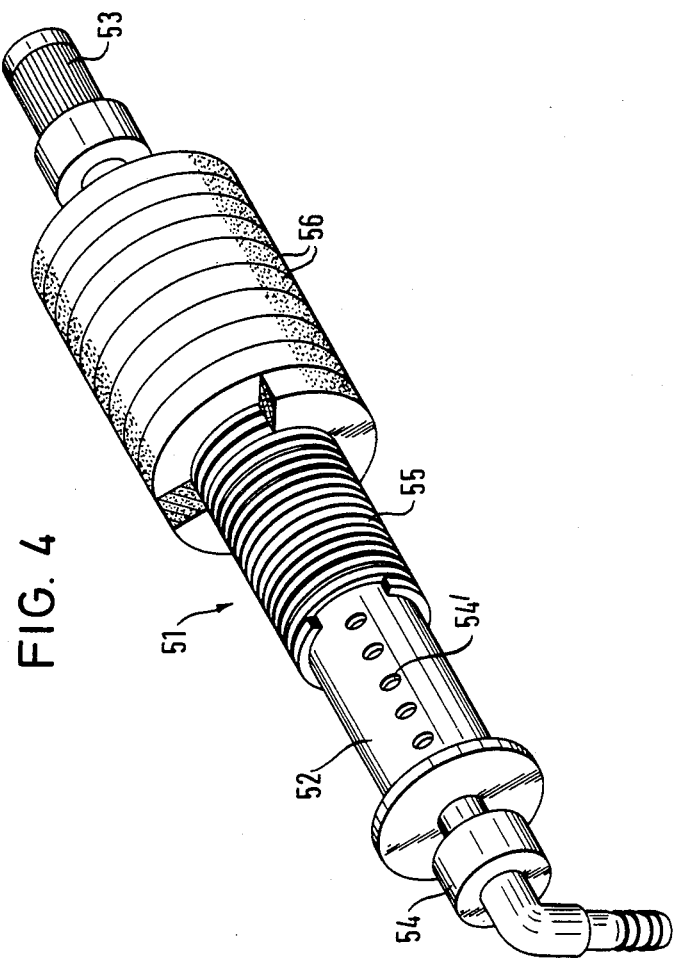

METHOD AND APPARATUS FOR DRYING PRINTED OR INKED WEBS BY MEANS OF HEAT

BACKGROUND OF THE INVENTION

The invention relates to the drying of printed or inked webs by means of heat.

In known driers the web to be dried is guided through a tunnel in which the web has hot air blown on to it on both sides and therefore has to be guided in a free-floating manner. However, with such a contactless drying process the heat transfer is very small, so that the drying tunnel has to be made comparatively long. A further disadvantage of known driers is that, because of the high expenditure of energy, the efficiency is extremely low. In the manufacture of paper it is already known to guide the damp web over heated rollers, with the result that the moisture contained in the paper web is evaporated by the hot contact. Although this method is suitable for the drying of damp paper webs, it is not suitable for the drying of printed webs, since the fresh ink would be deposited on the rollers and the ink would be smudged.

SUMMARY OF THE INVENTION

It is an object of the present invention to provide a method and an apparatus by means of which the difficulties previously encountered in the drying of printed or inked webs in particular are overcome.

It is a particular object of the invention to provide a method and an apparatus which permit a drying of printed or inked webs in a relatively short path length without the ink being smudged.

A further object of the invention is to provide a method and an apparatus which make possible the drying of printed or inked webs without the expenditure of the amount of energy previously considered necessary for this purpose.

In accordance with the present invention there is provided a method in which the web, in a first step, is subjected to a contactless heat shock treatment, in a second step is heated by a contact process at a lower temperature than in the first step, and, following that, in a third step, is cooled by a contact process.

Also, in accordance with the invention, there is provided an apparatus comprising a housing divided into at least three chambers through which the web is arranged to pass sequentially, a source of hot air for heat shock treatment of the web being provided in a first of the chambers, at least one pair of rotatable heated rollers for contact heating of the web in a second of the chambers, and at least one pair of rotatable cooling rollers for contact cooling of the web in the third of the chambers.

The heat shock treatment of the web in the first step is preferably carried out by the use of a gaseous medium at a temperature of about 300° C., while the temperature of the heated rollers in the second step or chamber is about 230° C. The temperature of the cooling rollers in the third step or chamber may be about 25° C.

One advantage of the method of the present invention lies in the fact inter alia that the web to be dried only needs to be subjected to hot air over a very short path length. In the first heat treatment step the upper surface of the web is only slightly dried, so that in the second heat treatment step in which there is contact drying by means of heated rollers, the web does not stick to the heated rollers, so that the ink is not smudged. Since the drying of the web is a contact drying process, correspondingly little energy needs to be used.

A further advantage of the invention lies in the fact that a drying apparatus operating according to the method only needs to be of short structural length. An advantage of the closed chamber arrangement which is used is that the applied energy is not lost but can be recovered by the use of heat exchangers. In order to prevent smudging of the ink and thus a contamination of the heated rollers or a build-up of ink on the heated rollers, each of the heated rollers preferably has associated therewith both an application roller for a buffer agent and also a cleaning roller. Further means are also preferably provided in order to recover the energy expended for the heating and cooling processes.

BRIEF DESCRIPTION OF THE DRAWINGS

A preferred embodiment of the apparatus and method in accordance with the invention will now be described in detail by way of example and with reference to the accompanying drawings. In the drawings:

FIG. 4 is a perspective view, partly cut away, on an enlarged scale, of one of the rollers for the application of a buffer agent or for the cleaning.

DETAILED DESCRIPTION OF THE INVENTION

Figure 1:
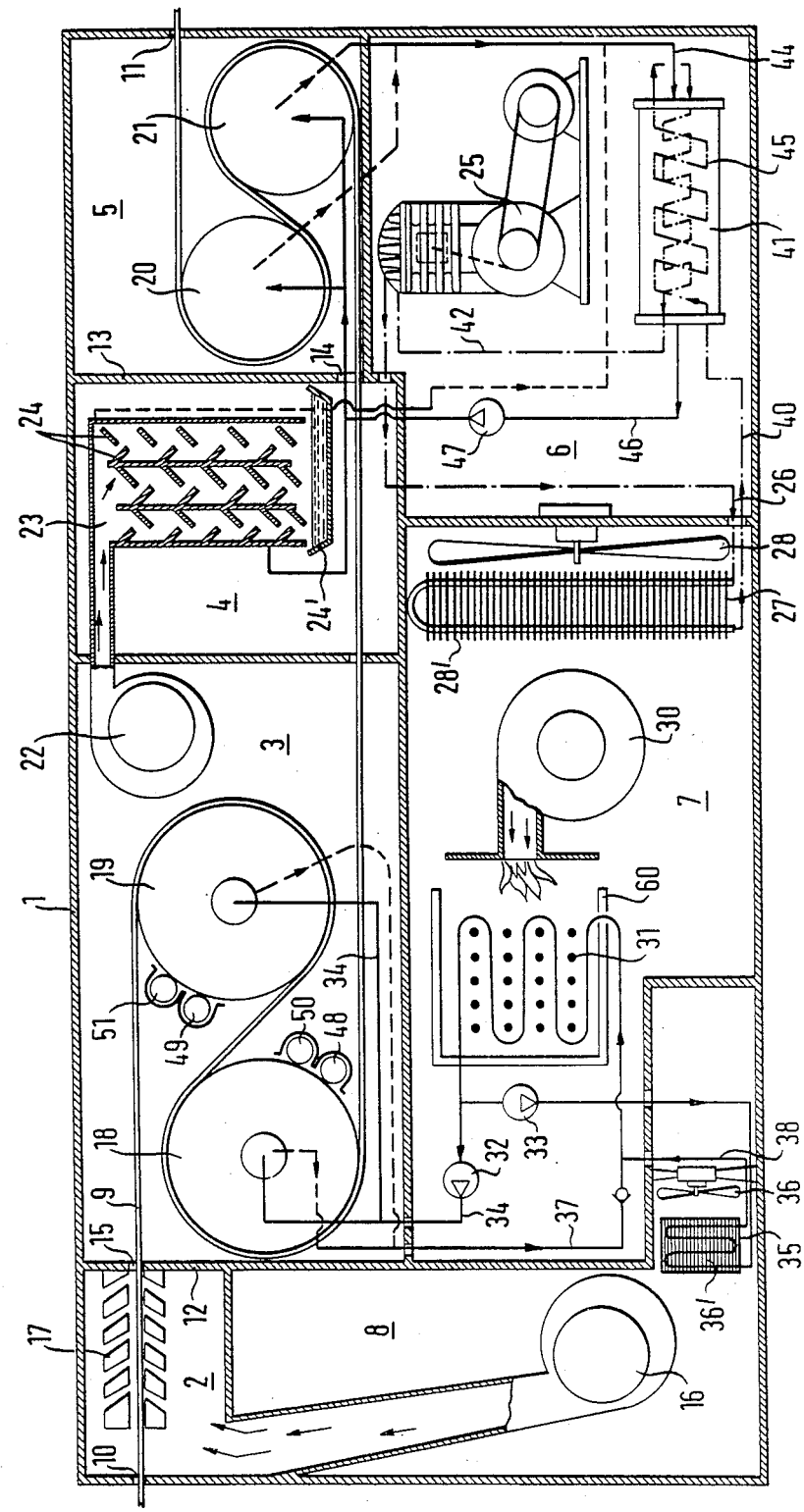
FIG. 1 is a schematic side view of a web drying apparatus in accordance with the invention.
Figure 2:
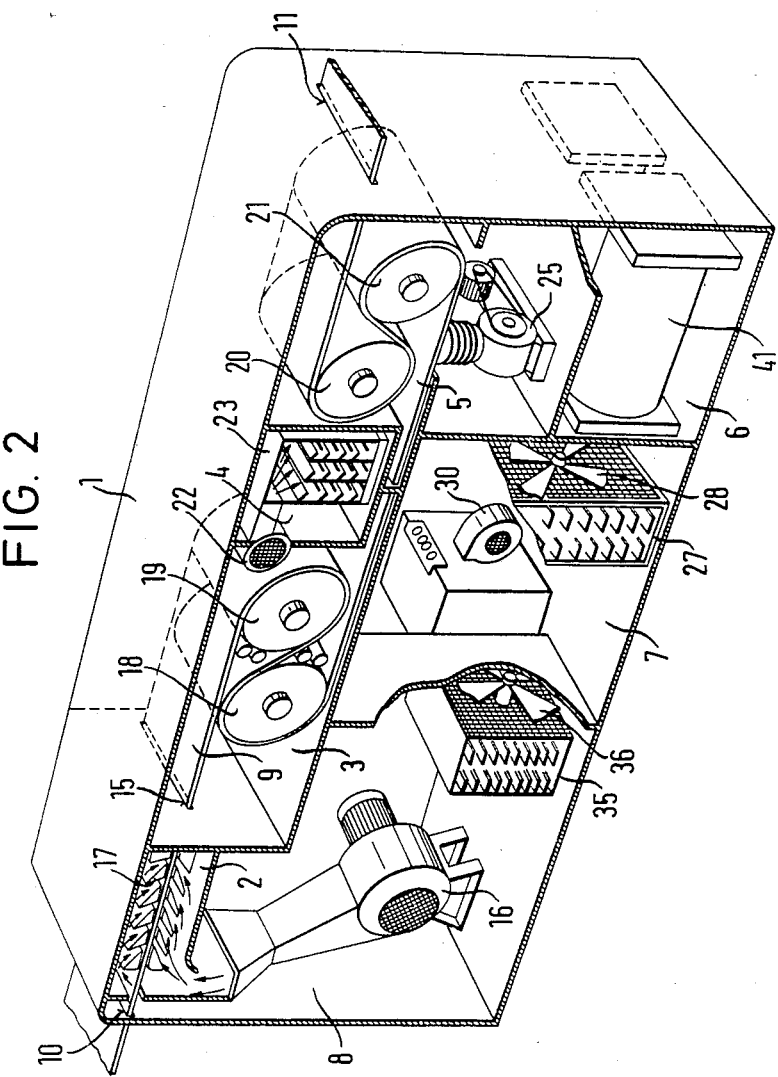
FIG. 2 is a perspective view of the web drying apparatus shown in FIG. 1.

FIGS. 1 and 2 show a substantially closed housing 1 which is divided into a number of chambers 2 through 8. A printed or inked web 9 runs sequentially through chambers 2, 3 and 5 for the purpose of drying the web. The web enters chamber 2 through an entry slot 10 and is guided out from the apparatus, out of chamber 5, through an exit slot 11. A wall 12 separating chamber 2 from chamber 3 is provided with a communicating slot 15 through which the web passes, and, in like manner, a separating wall 13 associated with chamber 5 is provided with a communicating slot 14 for the web.

The web 9 which first passes through chamber 2 is subjected in that chamber to a heat shock treatment. For this purpose hot air, for example at a temperature of about 300° C., is blown into chamber 2 by means of a blower 16 which is provided in chamber 8. The hot air is directed on to the surface of the web 9 in a targeted manner by the use of deflector plates 17. After the heat shock treatment, as a result of which the inked surface of the web gains a thin skin, the web 9 is guided in chamber 3 along an S-shaped path over and around a pair of heated rollers 19 and 18, thereby being subjected to contact drying. The temperature of the heated rollers 18, and 19 may be about 230° C. Although only one pair of heated rollers 18, and 19 is shown, one could alternatively provide a greater number of such rollers, as determined by the need. By looping the web in an S-shaped path around the heated rollers 18 and 19 one ensures that the upper and lower surfaces of the web are uniformly heated, and consequently that the ink is uniformly dried. After this contact drying process the web 9 passes into chamber 5 where it is cooled for example to about 25° C. or room temperature. For this purpose a pair of cooling rollers 21 and 20 are provided in chamber 5 around which the web is again looped in an S-shaped path. Instead of a pair of cooling rollers one could alternatively provide a greater number of cooling rollers, as desired. After the cooling process the web leaves the chamber 5 through the exit slot 11.

As mentioned above, a heated gaseous medium, and one is referring here in particular to hot air, is blown into the first chamber 2. In order to prevent the hot air escaping from the closed housing 1 through the entry slot 10, the entry slot 10 is made as narrow as possible, and can, if desired, comprise an appropriate sealing means, for example a labyrinth seal.

The communicating slot 15 in the dividing wall 12 between chamber 2 and chamber 3 is on the other hand comparatively large, so that the hot air blown into chamber 2 can pass through the communicating slot 15 into chamber 3. From chamber 3 the hot air is then blown by means of a blower 22 into a further chamber 4, and is preferably blown directly on to a liquid extractor 23 located therein. The extractor 23 comprises plates 24 through which a cooling medium such as cold water flows, so that a solvent contained in the hot exhaust air from chamber 3 condenses and can thus be recovered. The condensate runs down into a collecting tank 24' which is positioned below the extractor 23. The cooled air can be guided out of the housing through a filter (not shown) filled for example with activated carbon.

Within a suitable part of the housing, for example beneath chamber 5, there is provided a further chamber 6 in which is located a refrigerator or a compressor 25. A refrigerating medium heated by the refrigerator 25 flows through a pipe 26 to a heat exchanger 27 which is arranged in a chamber 7 also provided within the housing 1, in order to give off the heat to the ambient air. Associated with the heat exchanger 27 is a fan 28 which sucks in cold air from the outside through slots (not shown) provided in the sides of the housing 1 and which blows this cold air under pressure through the fins 28' of the heat exchanger 27. The air which is preheated in this way up to for example about 100° to 120° C. serves as combustion air for a heating device in the form for example of a hot blower 30 which likewise is provided in chamber 7. The hot blower 30 acts on a heat transfer medium or a heat transfer liquid in a heat exchanger 31 to heat this medium. From the heat exchanger 31 the heat transfer medium flows partly by means of a pump 32 and a pipe 34 to the heated rollers 18 and 19 in chamber 3 and partly by means of a pump 33 to a heat exchanger 35 in chamber 8. Associated with the heat exchanger 35 in chamber 8 is a fan 36 which sucks in air from the outside through air intake slots (not shown) in the housing 1 and which directs this air through the fins 36' of the heat exchanger 35.

The air heated to for example about 300° C. by the heat exchanger 35 is then blown by the blower 16, preferably directly into chamber 2, in order to carry out in this chamber 2 the first-mentioned short-term contactless heat drying process on the web 9. Both the heated rollers 18 and 19 and also the blower 16 preferably have heat sensors associated with them, by means of which the periods of time that the pumps 32 and 33 are switched on can be controlled, so that pump 32 only supplies heated heat transfer medium to the heated rollers 18 and 19 until the associated temperature sensors indicate a preset temperature of for example 230° C., while heat exchanger 35 is supplied by pump 33 with the heat transfer medium only until the temperature sensor associated with the blower 16 indicates that a desired predetermined temperature of the hot air of for example 300° C. has been reached. The return of the heat transfer medium after it has passed through the heated rollers 18 and 19 and through the heat exchanger 35 is effected by passing it through return pipes 37 and 38.

The refrigerating medium heated in the compressor 25 is supplied to heat exchanger 27. After passing through the heat exchanger 27 the cooled refrigerating medium passes through a pipe 40 into a heat exchanger 41 and from there by way of a pipe 42 back to the compressor 25. In heat exchanger 41 the refrigerating medium of the compressor 25 is heated again, so that no energy has to be supplied by the compressor 25 for the heating of the refrigerating medium.

For the cooling of the plates 24 of the extractor 23 through which the cooling medium flows, and for the cooling of the cooling rollers 20, and 21, there is provided a cooling medium circulating system which is independent of the refrigerating medium circulating system (which consists of the compressor 25 and the heat exchanger 27), as can be seen from FIG. 1. The cooling medium, for example cold water, heated in the extractor 23 and in the cooling rollers 20 and 21 flows through a pipe 44 into heat exchanger 41 where a heat transfer with the refrigerating medium of the compressor 25 flowing through the pipe 45 takes place. By this means the cooling medium for the extractor 23 and for the cooling rollers 20, and 21 is cooled.

The cooled cooling medium is fed back through a pipe 46 fitted with a pump 47, back again to the extractor 23 and to the cooling rollers 20, and 21. As shown, the housing 1 is screened from the environment and internally is divided hermetically by the chambers 2 through 8. In this way a substantially closed energy circuit is created so that the efficiency and consequently the saving in energy as compared with conventional drying systems is considerably increased and can amount for example to about a 60% saving.

Figure 3:
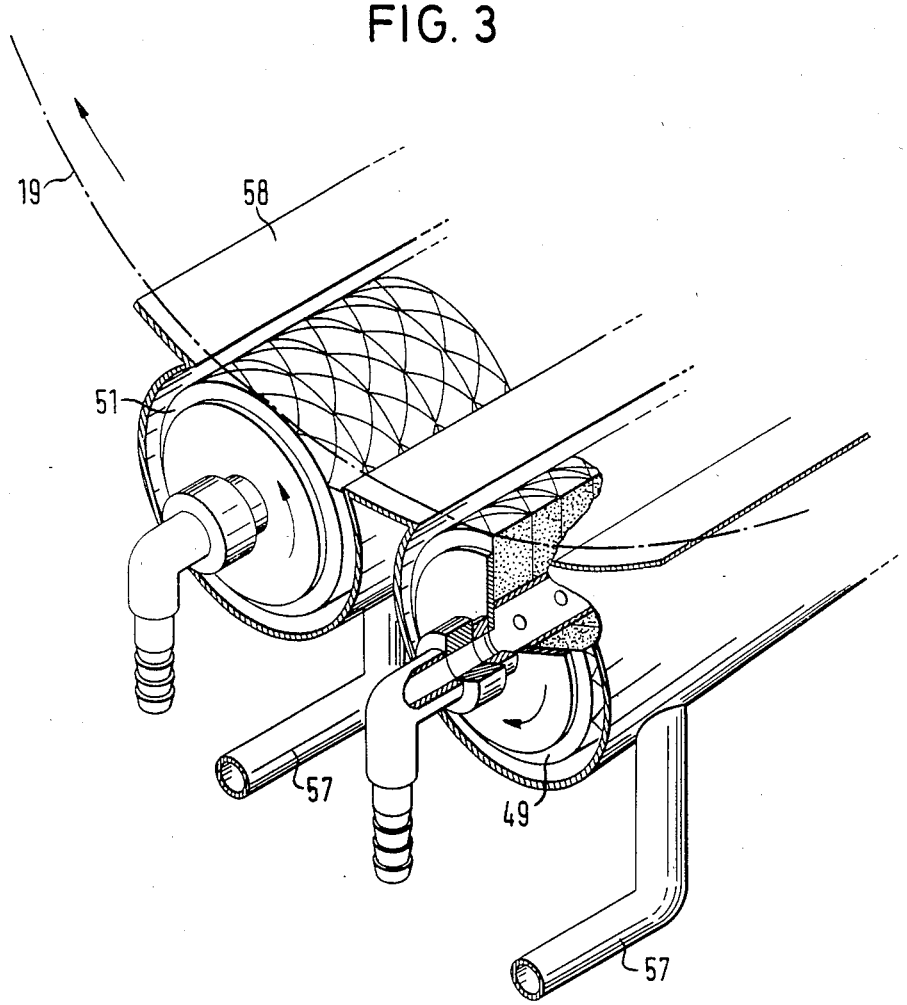
FIG. 3 is a detailed view, on an enlarged scale, of the application roller and cleaning roller in the apparatus shown in FIG. 1.

As will be seen from FIG. 1, each heated roller 18, and 19 has associated therewith a cleaning roller 48, and 49 and an application roller 50, and 51 for a buffer agent. Since the cleaning and application rollers are identical in form, there is shown in FIG. 3 just one of the heated rollers in combination with an application roller 51 and a cleaning roller 49. The application roller 51 is for the purpose of continuously applying to the heated roller a thin film of a buffer agent, for example a silicon-containing liquid, in order to prevent the fresh ink which is to be dried from being deposited on the roller. The cleaning roller 49 associated with the application roller 51 is for the purpose of wiping off the film of buffer agent laid down by the application roller 51 after one revolution of the heated roller. By this means one ensures that there is always a fresh film of buffer agent present between the web 9 which is to be dried and the heated roller 19. The rotational speed of the heated roller 19 is greater than the rotational speed of the cleaning roller 49 and of the application roller 51, with the result that the direction of rotation of the cleaning roller 49 is in the opposite direction to the direction of rotation of the heated roller 19.

The applied thickness both of the film of buffer agent and also of the cleaning agent can be adjusted appropriately by stepless variation of the speed of rotation and/or by changing the pressure of the buffer agent or cleaning agent. Since the rollers 48 and 51 are identical in form, FIG. 4 is a perspective view of just one of these rollers, in this case the application roller 51. This comprises a tubular body 52 which can be driven by a motor, for example a pneumatic motor 53, mounted on a flange at one end of the body. At the other end of the tubular body 52 there is provided a rotary coupling 54 by means of which the buffer agent can be pumped into the interior of the tubular body 52. The buffer agent flows to the outside of the tubular body 52 by way of a number of holes 54' which are provided through the tubular body. Additionally, as shown, a wire 55 can be wound helically around the tubular body 52. Rings 56 of a fibrous or felt-type material are arranged on the wire coil to lie tightly against one another. The felt rings 56 are thus soaked uniformly with the buffer agent. The felt rings 56 then moisten the heated roller 19 with a very thin film of buffer agent. After one revolution of the heated roller 19 the buffer agent applied by the application roller 51 comes into contact with the cleaning roller 49, from the felt rings 56 of which there comes continuously a cleaning agent which forms a thin film on the heating roller. Because of the relative speed difference between the heated roller 19 and the cleaning roller 49 the film of buffer agent laid down by the application roller 51 and which is perhaps slightly dirty is cleaned off. The buffer agent which is cleaned off then flows away through a discharge pipe 57. Since the outer surfaces of the rollers 49 and 51 are porous and the buffer agent and cleaning agent are each forced from the inside outwardly, a continuous self-cleaning action takes place. The discharge pipe 57 is connected to a tank 58 which encloses both the cleaning roller 49 and also the application roller 51, as is shown in FIG. 3. Preferably, a guide device extends between the discharge pipe 57 and the application roller 51 over the whole length of the latter, in order to guide away the dirty buffer agent cleaned off from the heated roller 19 by the cleaning roller 49.

From FIG. 1 it can be seen that the heat exchanger 41, in which a heat exchange takes place between the refrigerating medium of the refrigerating medium circulating system and the cooling medium of the cooling medium circulating system, is arranged in chamber 6, together with the compressor 25. The heat exchanger 27 of the refrigerating medium circulating system, the hot blower 30 and the heat exchanger 31 of the circulating system for the heat transfer medium are all located in chamber 7. The heat exchanger 35 for the hot air to be supplied to chamber 2 is provided in chamber 8, together with the hot air blower 16.

The refrigerating medium of the refrigerating medium circulating system which includes the compressor 25 flows through heat exchanger 27 and heats up the combustion air for the hot blower 30. The cooled refrigerating medium flowing back from heat exchanger 27 flows into heat exchanger 41 in order to cool the cooling medium of the cooling medium circulating system. The cooled cooling medium passes to the extractor 23 and to the cooling rollers 20, and 21, in order then to flow back to heat exchanger 41. The liquid heat transfer medium heated in heat exchanger 31 by means of the hot blower 30 flows partly to the heated rollers 18, and 19 and partly to heat exchanger 35 in chamber 8. Associated with heat exchanger 31 in chamber 7, as shown schematically in FIG. 1, there may be an exhaust flue for leading the waste combustion gases from the hot blower 30 to the outside of the housing. Chambers 6, 7 and 8 are preferably hermetically separated from one another.

The invention has been described above in relation to a preferred embodiment. However, the present invention may be embodied in other specific forms without departing from the spirit or essential attributes thereof, and, accordingly, reference should be made to the appended claims, in addition to the foregoing specification, as indicating the scope of the invention.

I claim:

1. A method of heat-drying a web, particularly a printed or inked web, which comprises subjecting the web in a first step to a contactless heat shock treatment by a gaseous medium at a temperature of about 300° C., heating said web in second step by a contact heating process by contacting said web with at least two heated rollers at a temperature of about 230° C. and in a third step cooling said web by a contact process utilizing cooling rollers at a temperature of about 25° C., said second contact heating step including the application of a buffer agent to said respective heated rollers to prevent ink from being deposited thereon and application of a cleaning agent to said respective heated rollers for wiping off said buffer agent so as to clean said respective heating roller.

2. An apparatus for heat-drying of a web, particularly a printed or inked web, comprising a housing divided into at least three treatment stations through which said web is arranged to pass sequentially; means at a first treatment station for a contactless, short-term heating of said web by means of a gaseous medium at a first high temperature; means at a second treatment station for contact heating of said web at a second high temperature which is lower than the first temperature, said means for contact heating of said web comprising at least a pair of heating rollers, each heating roller having associated therewith an application roller for applying a buffer agent to said respective heating rollers to prevent ink from being deposited thereon and a cleaning roller for applying a cleaning agent to said respective heating rollers for wiping off said buffer agent applied to said heating rollers by said application roller; and means at a third treatment station for contact cooling of said web.

3. An apparatus according to claim 2, in which said application rollers and cleaning rollers are of a smaller diameter than said heated rollers and are driven at a lower rotational speed than said heated rollers.

4. An apparatus according to claim 2, in which each application roller and cleaning roller comprises a tubular body provided with radial apertures therethrough, and a porous covering means on each tubular body.

5. An apparatus according to claim 4, in which said porous covering means comprises a plurality of rings of felt-type materials packed closely juxtapositioned to each other around said tubular body.

6. An apparatus according to claim 5, which includes a wire wound helically about said tubular body, over which said rings of felt-type material are fitted.

7. An apparatus for the heat-drying of a web, particularly a printed or inked web, comprising a housing divided into a plurality of chambers, a source of hot gaseous medium for contactless shock heating of said web in a first of said chambers, at least one pair of drivable heating rollers for contact heating of said web in a second of said chambers, around which rollers said web is looped in a substantially S-shaped manner, each heating roller having associated therewith an application roller for applying a buffer agent to said respective heating roller to prevent ink from being deposited thereon and a cleaning roller for applying a cleaning agent to said respective heating roller for wiping off said buffer agent applied to said heating roller by said application roller; at least one pair of drivable cooling rollers for contact cooling of the web in a third chamber; a circulating system for a cooling medium, said cooling medium circulating system comprising said cooling rollers and a first heat exchange means arranged in heat exchanging relationship with a circulating system for a refrigerating medium which has incorporated therein a second heat exchange means, said first heat exchange means being disposed in a fifth chamber and said second heat exchange means in a sixth chamber of said housing; and a circulating system for heat transfer medium for heating said heating rollers, said heat transfer medium circulating system comprising heating means disposed in said sixth chamber.

8. The apparatus according to claim 7, in which said heating means disposed in said sixth chamber comprises a heater and third heat exchange means incorporated in said heat transfer medium circulating system.

9. The apparatus according to claim 8, in which said source of hot gaseous medium for shock heating of said web comprises a fourth heat exchange means adapted to be connected with said heat transfer medium circulating system and means for directing a flow of said hot gaseous medium into said first chamber, said fourth heat exchange means and said flow directing means being disposed in a seventh chamber in said housing.

10. An apparatus according to claim 7, in which said chambers a hermetically separated one from another.

11. An apparatus according to claim 7, further including a blower having suction side in communication with said second chamber and an output side in communication with a fourth chamber, and a liquid extraction means being provided in said fourth chamber.

12. An apparatus according to claim 11, in which said liquid extraction means and said cooling rollers are supplied with a cooling medium from a common cooling medium from a common cooling circulating system.

13. The apparatus according to claim 7, in which said refreigerating medium circulating system comprises a refrigerating machine disposed in a fifth chamber housing said first heat exchange means.

* * * * *